US010161385B2

(12) United States Patent
Busker et al.

(10) Patent No.: US 10,161,385 B2
(45) Date of Patent: Dec. 25, 2018

(54) METHOD FOR CONTROLLING A WIND PARK

(71) Applicant: Wobben Properties GmbH, Aurich (DE)

(72) Inventors: Kai Busker, Großefehn (DE); Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/786,109

(22) PCT Filed: Mar. 25, 2014

(86) PCT No.: PCT/EP2014/055992
§ 371 (c)(1),
(2) Date: Oct. 21, 2015

(87) PCT Pub. No.: WO2014/173600
PCT Pub. Date: Oct. 30, 2014

(65) Prior Publication Data
US 2016/0069324 A1 Mar. 10, 2016

(30) Foreign Application Priority Data
Apr. 22, 2013 (DE) .................. 10 2013 207 264

(51) Int. Cl.
*F03D 9/00* (2016.01)
*H02P 9/04* (2006.01)
(Continued)

(52) U.S. Cl.
CPC ........... *F03D 7/048* (2013.01); *F03D 7/0284* (2013.01); *F03D 7/043* (2013.01); *F03D 9/257* (2017.02);
(Continued)

(58) Field of Classification Search
CPC ........ F03D 7/048; F03D 7/043; F03D 7/0284; F03D 9/005; Y02E 10/723
(Continued)

(56) References Cited

U.S. PATENT DOCUMENTS 4,603,394 A * 7/1986 Bukowski ............... F01K 7/345
290/40 R
8,170,723 B2 * 5/2012 Berggren ................ H02J 3/005
290/2
(Continued)

FOREIGN PATENT DOCUMENTS

CN 101521388 B 3/2014
DE 10 2008 039 429 A1 2/2010
(Continued)

*Primary Examiner* — Tulsidas C Patel
*Assistant Examiner* — Thomas Quigley
(74) *Attorney, Agent, or Firm* — Seed IP Law Group LLP

(57) ABSTRACT

The invention relates to a method for supplying the electric power of a wind park comprising several wind turbines into an electric power supply grid, wherein each of the wind turbines provides an electric turbine output and the sum of all provided turbine outputs is supplied to the electric power supply grid as wind park output, and a turbine target value is specified for each of the wind turbines as a specification of the turbine output that is to be provided, and the turbine target value is controlled via a controller based on a control deviation, as a comparison of the supplied wind park output and a target value of the wind park output that is to be supplied.

13 Claims, 4 Drawing Sheets

(51) Int. Cl.
*F03D 7/04* (2006.01)
*F03D 7/02* (2006.01)
*F03D 9/25* (2016.01)

(52) U.S. Cl.
CPC ....... *F05B 2270/335* (2013.01); *Y02E 10/723* (2013.01)

(58) Field of Classification Search
USPC .......................................................... 290/44
See application file for complete search history.

(56) References Cited

U.S. PATENT DOCUMENTS

| | | | |
|---|---|---|---|
| 8,174,143 B2 | 5/2012 | Yasugi | |
| 8,588,987 B2 | 11/2013 | Riesberg et al. | |
| 8,694,171 B2 | 4/2014 | Ichinose et al. | |
| 8,803,351 B2* | 8/2014 | Dalsgaard | F03D 7/0224 290/44 |
| 9,026,258 B2 | 5/2015 | Stapelfeldt | |
| 9,118,214 B2* | 8/2015 | Nielsen | F03D 9/005 |
| 9,287,814 B2 | 3/2016 | Yasugi et al. | |
| 9,368,971 B2* | 6/2016 | Ellena | H02J 3/38 |
| 9,407,186 B2* | 8/2016 | Babazadeh | H02J 3/16 |
| 2004/0267466 A1* | 12/2004 | Enis | F03D 7/0284 702/60 |
| 2005/0042098 A1 | 2/2005 | Wobben | |
| 2006/0089805 A1* | 4/2006 | Enis | F03D 7/0284 702/2 |
| 2007/0299548 A1* | 12/2007 | Weitkamp | F03D 7/046 700/52 |
| 2008/0088129 A1* | 4/2008 | Altemark | F03D 7/043 290/44 |
| 2008/0172279 A1* | 7/2008 | Enis | G06Q 10/06315 705/7.25 |
| 2009/0096211 A1* | 4/2009 | Stiesdal | H02J 3/1835 290/44 |
| 2009/0102198 A1* | 4/2009 | Egedal | F03D 80/10 290/44 |
| 2009/0167021 A1 | 7/2009 | Andersen | |
| 2009/0218817 A1 | 9/2009 | Cardinal et al. | |
| 2010/0138058 A1 | 6/2010 | Kirchner et al. | |
| 2010/0268393 A1* | 10/2010 | Fischle | F03D 7/028 700/287 |
| 2010/0332042 A1* | 12/2010 | Riesberg | F03D 7/0284 700/287 |
| 2011/0130889 A1* | 6/2011 | Khajehoddin | H02J 3/383 700/298 |
| 2011/0301769 A1* | 12/2011 | Lovmand | F03D 7/028 700/287 |
| 2012/0306203 A1* | 12/2012 | Drossel | F03D 7/0284 290/44 |
| 2014/0138949 A1* | 5/2014 | El Moursi | H02P 29/032 290/44 |

FOREIGN PATENT DOCUMENTS

| | | |
|---|---|---|
| DE | 10 2009 030 725 A1 | 12/2010 |
| DE | 10 2011 112 025 A1 | 2/2013 |
| JP | 49104121 A | 10/1974 |
| JP | 2005505223 A | 2/2005 |
| JP | 2006-60961 A | 3/2006 |
| JP | 2010-084545 A | 4/2010 |
| RU | 2 221 165 C2 | 6/2003 |
| RU | 85 568 U1 | 8/2009 |
| TW | 201036302 A1 | 10/2010 |
| WO | 2010/109262 A2 | 9/2010 |
| WO | 2011158351 A1 | 12/2011 |
| WO | 2012056564 A1 | 5/2012 |
| WO | 2012117491 A1 | 9/2012 |

* cited by examiner

METHOD FOR CONTROLLING A WIND PARK

BACKGROUND

Technical Field

The present invention relates to a method for supplying the electric power of a wind park comprising several wind turbines into an electric power supply grid. The present invention moreover relates to a wind park that qualifies for this purpose.

Description of the Related Art

Wind parks are generally known today, and they describe a conglomeration of wind turbines forming a common unit. Such a wind park is defined, in particular, by a point of common coupling (PCC). All wind turbines use such a point of common coupling to supply electric power into the supply grid.

Ideally, the wind turbines—and thus the wind park—will supply as much power into the supply grid as is possible given the prevailing wind conditions. There may be also situations where it may be desirable to reduce the supplied power, for example in the case of a power surplus at the supply grid. On the other hand, it may also make sense to reduce the performance of the wind park below the currently feasible value, for example in anticipation of an increased power demand at the grid, to be able to increase the supplied power as soon as the anticipated high demand occurs suddenly at the grid.

From patent application US 2005 0042098 A1 we know that the grid operator can specify a percentage power value for the wind park, which—in relation to the wind park's nominal powers—specifies a lower, desired power value to be supplied. For example, if the grid operator wants the wind park to supply no more than half of the nominal power, he can specify a value of 50 percent for the wind park. This value is then supplied to the wind turbines, which will reduce their output accordingly. In this way, not more than half of the nominal power is supplied.

A problem may arise, for example, if one wind turbine fails to work. In that case, this failed installation would not provide any power at all. The remaining installations could provide correspondingly more power if they could recognize the failure of that one installation, and if the power level were known by means of which the failure of this one wind turbine could be compensated by the remaining wind turbines. However, such an exchange of information, as well as the coordination of the wind turbines to compensate for such deficiency in output, is complicated. One must also take into account that some wind parks comprise wind turbines with different power output, and sometimes even wind turbines stemming from different manufacturers. Those are called mixed wind parks.

The German Patent and Trademark Office has researched the following prior art in the priority application for this application: DE 10 2009 030 725 A1, DE 10 2011 112 025 A1 and US 2005/0042098 A1.

BRIEF SUMMARY

One or more embodiments of this invention may address one of the above problems. One or more embodiments are directed to a process of supplying an electric power supply grid with the power generated by a wind park. What is provided is a wind park featuring several wind turbines that supply jointly into an electric power supply grid. Each wind turbine provides an electric power turbine output. Said electric power turbine output indicates the respective active power currently provided by the respective wind turbine. This means that power, or output, or wind park output basically means active power P.

The sum of all power provided by the wind turbines of said wind park—provided that they are subject to the proposed method—is the wind park output that is supplied to the electric power supply grid.

A turbine target value is now provided to each of the wind turbines. Said turbine target value indicates to the respective wind turbine the amount of output to be provided. Each of the wind turbines will hence try to generate and provide as much active power as currently specified by the turbine target value. This can also mean that the wind turbines, or even just a single wind turbine, will stay below the specified value, if, for example, the prevailing wind conditions allow for only a lower value. A lesser amount of power can also be supplied if other framework conditions do not allow for the provision of the amount of power that has been specified by the turbine target value. It is now hereby proposed to control the turbine target value by means of a controller. Said adjustment control shall take place such that the supplied wind park output, namely in particular at the point of common coupling, is compared to a target value of the wind park output to be supplied. Such target value can be specified, for example, by the operator of the supply grid. During such comparison, a deviation is determined that is used here as a control deviation. The turbine target value is controlled based on such control deviation.

This means that the specified target value of the wind park output, which is to be supplied, is not simply forwarded—or first apportioned to the individual installations and then forwarded—but the actual wind park output is, instead, compared to the specified wind park output, and a target value is then specified as a function thereof. If the comparison shows, for example, that the supplied wind park output is still greater than the desired output, the turbine target value is accordingly reduced even further. The assignment of said wind park output to the individual wind turbines, the outputs of which add up to said wind park output, does not have to be known here. It does not have to be checked whether all installations in the wind park provide a comparatively low output, or whether some installations have just stopped working and the remaining installations provide a less strongly reduced output.

Preferably, the controller will issue a relative target value as the turbine target value, which relates to the respective nominal power of the wind turbine. It will issue, in particular, a corresponding percentage target value. The same value is provided moreover—or alternatively—to each wind turbine. For example, the controller may initially issue the value 100 percent to all wind turbines, in particular if the target value of the wind park output to be supplied is 100 percent, or if no value has been specified for the wind park output—i.e., if the wind park may supply as much power as is currently possible.

This means that each wind turbine is given a value of 100 percent as its turbine target value. In this way, each wind turbine can supply as much power as possible. With the above-described approach, it is assumed that the nominal power of the wind turbine is the maximum possible power, even though most of the wind turbines could theoretically generate more power than their nominal power under adequate wind conditions. However, under normal operating conditions of a wind turbine, the nominal power value can be taken as the practical maximum value.

Now, if the target value is reduced, and if one assumes, for the sake of simplicity, that all wind turbines are operating and that they currently provide nominal power, this will initially result in a difference between the wind park output target value to be supplied and the actual supplied wind park output. The turbine target value is now reduced based on the difference identified, namely based on the control deviation. In the case of a P-control, said reduction may be volatile at first, if the change in the target value of the wind park output to be supplied—which for purposes of simplification is referred to as wind park target value—is volatile, as well. Other controller types may be suitable as well, for example PI-controllers. The turbine target value is thus reduced to, for example, 80 percent, if the specified wind park target value, for example, was also 80 percent. The wind turbines will now adapt their output according to the target value, and will reduce it, for example, to 80 percent—to mention a very simple and also very simplified example. The overall wind park output that is supplied is hence also reduced to 80 percent to thus achieve the desired wind park output target value.

Now, if a wind turbine stops working, the supplied wind park output will be reduced accordingly by the power that such non-working installation would have supplied before it stopped working. For example, if the wind park output is only 70 percent, it will be below the wind park target value. But the controller will detect this and will increase the turbine target value.

Such increased output target value is transmitted to all wind turbines, including to the one that stopped working, although this will not have any bearing on said wind turbine at first. The other installations will, however, increase their performance, until the actually supplied wind park output has reached the wind park target value, provided this is at all possible. In that case, for example, the default target value is 85 percent, and all wind turbines in the wind park will possibly provide 85 percent of their respective nominal power. Only the installation that stopped working will provide 0 percent of its nominal power.

In the end, this means that all wind turbines in the wind park have been coordinated without knowing, in detail, how much power can be generated by which wind turbine. It is not necessary to determine which one of the installations mentioned in the above example actually stopped working, since according to this embodiment the default value relates to the respective wind turbine, namely here to the nominal power of the respective wind turbine. Therefore, the same value can be specified for all installations—namely 85 percent in the last condition of the stated example. For the one 1-MW wind turbine, this means 85 percent of one megawatt, while for a 7.5-MW wind turbine, it means 85 percent of 7.5 megawatts.

However, as an alternative, a separate default value can be determined for each wind turbine. But this is not the favored solution to the problem.

The use of a relative or, respectively, standardized target value as the turbine target value, is thus also an easy way of providing each wind turbine with the same value. This means that, in fact, only one single value needs to be calculated and provided to each wind turbine.

According to one embodiment, it is proposed to change the type of controller and—or alternatively—its parametrization. This allows for the consideration of different situations or operating conditions at the wind park and/or at the supply grid. These may be both temporary and permanent situations or operating conditions. The wind park may be connected, for example, to a strong or weak grid, which may be taken into account by said controller that determines the turbine target value depending on the wind park target value. Another thing that may be taken into account is an expected fluctuation in the performance of the grid or, for example, the dynamics or, respectively, the potential dynamics of the wind park.

According to one embodiment, it is proposed to change the controller type and/or the parametrization by way of a selection signal. The operator of the wind park and/or the operator of the supply grid may use said selection signal to set a default value. For example, should the grid operator expect a volatile change in the available or requested power soon, he may, for example, request a highly dynamic controller via the selection signal. Such highly dynamic controller can be achieved through a corresponding parametrization and/or selection of a correspondingly dynamic controller type.

Another example would be a situation where the grid operator is aware of work being carried out on the grid and where, for example, an important section of the grid is interrupted temporarily. Here, one could also request a controller that would provide better stabilization for the weakened grid.

Such requested change in controller type may also mean that the controller, which controls the turbine target value, considers yet another input parameter.

According to one embodiment, it is proposed to change the controller type and/or the parametrization based on a grid sensitivity of the supply grid. Grid sensitivity here means the grid's reaction, in particular in relation to the point of common coupling, to a change in a parameter affecting the grid. Grid sensitivity can be defined as the difference of a grid reaction in relation to a difference of a grid influence parameter. What comes into question here, in particular, is a definition in relation to the supplied active power and line voltage level. Put in simplified terms, the following formula can be defined, for example, for the grid sensitivity GS:

$$GS = \frac{\Delta U}{\Delta P}$$

Here, ΔP describes the change in supplied active power, namely the supplied wind park output, and ΔU describes the resulting change in the line voltage U. These differences are created over a very brief period of time, in particular in the area of one second or less, and preferably, instead of using this descriptive formula, a partial derivative of line voltage U can be also created based on the supplied wind park output P according to the difference of the voltage in relation to the difference of the power. Another possible grid reaction could be a change in grid frequency. Another way of considering grid sensitivity would be to apply the following formula:

$$GS = \frac{\Delta f}{\Delta P}$$

According to one embodiment, it is proposed to change the controller type and/or the parametrization based on a short circuit ratio.

Short circuit ratio (also referred to as SCR) means the ratio of short circuit power to connected load. Short circuit power is the power that the respective supply grid can provide at the considered point of common coupling to which the wind turbine or, respectively, the wind park is connected, if there is a short circuit at the point of common coupling. The connected load is the connected load of the connected wind turbine or, respectively, of the connected wind park, and thus—in particular—the nominal power of the generator that is to be connected or, respectively, the sum of all nominal powers of the generators of the wind park. The short circuit ratio is thus a criterion for the strength of the electric power supply grid in relation to such considered point of common coupling. A strong electric power supply grid relating to said point of common coupling has mostly a large short circuit ratio of, for example, SCR=10.

It has been recognized that the short circuit ratio can also provide information on the behavior of the respective supply grid at the point of common coupling. The short circuit ratio may also vary.

When installing a wind park or wind turbine for the first time, it is advantageous to consider the short circuit ratio and to adapt the active power control and the reactive power control thereto. Preferably, it is further proposed to record the short circuit ratio on a regular basis even after the installation and commissioning of a wind turbine or wind park. The short circuit power can be recorded, for example, based on information on the grid's topology using simulation. The connected load can be determined simply by having knowledge of the wind turbines installed at a wind park and/or by measuring the power supplied at nominal wind.

According to one configuration it is proposed to keep available as a selectable controller type a P-controller (proportional controller), a PI-controller (proportional-integral controller), a PT1-controller (a controller having a characteristic of a low pass filter first order) or a hysteresis controller. Preferably, the controller may also provide at its input or output a dynamic limitation ensuring that, in the event of such limitation at the input, the wind park target value or, respectively, the resulting difference from the wind park actual value may rise only at a limited inclination. As an alternative, a similar inclination limitation may be provided at the output, i.e., for the established turbine target value.

A specified hysteresis controller relates in particular to a controller configuration that is nonlinear and that reacts differently in the case of an increase in control deviation than in the case of a decrease in control deviation.

Another configuration proposes to record a grid frequency of the voltage of the supply grid, namely in particular at the point of common coupling. The turbine target value is then set based on the grid frequency and/or based on a change in grid frequency.

For example, the turbine target value may be reduced if the grid frequency exceeds the nominal frequency or a limit above the nominal frequency. The turbine target value may be reduced even further if a positive change in grid frequency has been recorded. If the change in grid frequency is negative, on the other hand, i.e., if the grid frequency is again approaching the nominal value, a lesser reduction in power and thus a less reduced turbine target value may be provided for. Such consideration of the grid frequency or of its change may also take place together with the implementation of a wind park target value.

According to one embodiment, each wind turbine specifies its own power adjustment depending on the frequency or on the change in frequency. This means that each wind turbine applies its own algorithm that reduces or increases the provided output.

Preferably, the change in, or selection of, the controller type and/or of its parametrization will also depend on the fixed grid frequency and also, or alternatively, on the change in grid frequency. For example, in the case of strong or fast fluctuations in frequency, i.e., when a great change in grid frequency is recorded, one could select a particularly stabilizing controller to regulate the turbine target value.

Preferably, the following basic controller settings—hereinafter referred to as basic control types—should be provided for.

According to one controller setting, there is no reduction in wind park output. This is proposed herein as the first basic control type. In that case, the wind park target value is not set at all or is set to 100 percent. Since a supplied wind park output in excess of 100 percent is not to be expected, the evaluation of the control deviation between supplied wind park output and intended wind park output will generally result in a negative value or in a value of not more than 0. Here, a limit prevents the control from increasing the turbine target value to more than 100 percent. As an alternative, said turbine target value can also be increased to more than 100 percent, as this will not lead to any other result than if such value had been 100 percent. In such standard case, where the wind park output is not to be reduced, the control output may also be set to a steady value of 100 percent, and/or the control deviation may be artificially set to 0.

As another controller configuration, it is proposed to have the wind park output specified externally, in particular by the operator of the supply grid. This is referred to herein as the second basic control type. In that case, the controller will determine the turbine target value only based on the control deviation between the specified wind park output and the supplied wind park output. This means that the turbine target value is adjusted by the controller until the supplied wind park output corresponds to the specified wind park output—at least in terms of the desired accuracy.

As a third basic control type, it is proposed to specify a wind park target value and that, moreover, each wind turbine adjusts its provided output depending on the frequency or on the change in frequency. This third basic control type thus corresponds to the second basic control type, except that with the third basic control type the individual wind turbines additionally provide for an active power control that depends on the frequency or on the change in frequency.

As a fourth basic control type or, respectively, as basic control type 4, it is now proposed for a wind park output to be specified and for the controller to determine a turbine target value based on the control deviation between the wind park target value and wind park actual value while considering the grid frequency and/or a change in grid frequency. This corresponds to basic control type 2, except that the turbine target value here also depends on the grid frequency or on a change in grid frequency. Here, one can additionally provide for the installations themselves to contain a frequency-dependent power control. However, to avoid opposing frequency-dependent controls, a frequency-dependent power control is preferably ruled out or turned off for the wind turbines if this is already taken into account centrally by the controller, as proposed in the case of basic control type 4.

What is proposed, in particular, is to switch between these four basic control types. Such switching can be performed by an external signal, for example by the grid operator. Such switching can be also performed based on a recording of grid sensitivity and/or based on a frequency of the grid and/or based on a change in frequency. If several criteria are considered, they can be combined via a valuation function, and a criterion can be specified via a threshold determining when such switching will actually take place. Preferably, a hysteresis element will be installed here, as well, to avoid a constant switching back and forth between two or more controller types, in particular two or more basic control types.

However, a switching between, in particular, the aforementioned basic control types may also take place during the installation or commissioning of the wind park. A corresponding indicator—also referred to as a flag—may be set for this purpose. In this respect, said indicator or flag constitutes a signal for setting or selecting the corresponding controller.

Preferably, a basic control type may be selected or changed and, in addition, a parametrization may be modified. In addition, one may also select or switch a controller as the content of the basic control type respectively selected, namely switching from a PI-controller to a hysteresis controller, to mention just one example.

Preferably, the turbine target value is determined by a central control unit. The controller is thus located inside the central control unit of a wind park. Said central control unit may be a separate unit at the point of common coupling, or it may be provided in a wind turbine, for example at the bottom of a wind turbine that is installed close to the point of common coupling. Preferably, the central control unit may be also provided inside a transformer unit at the point of common coupling. Preferably, said central control unit comprises measuring equipment for recording the line voltage and/or grid frequency of the supply grid.

What is moreover proposed according to the invention is a wind park that has been prepared to be operated by a method pursuant to one of the aforementioned embodiments. Said wind park should be, in particular, FACTS-compliant.

The method for supplying electric power into a supply grid is described based on numerous embodiments and relates to the supplying of active power into the electric power supply grid. Likewise, it is possible in this way to control the reactive power to be supplied to the grid, namely by specifying a reactive power target value for the wind park and by having the controller determine and provide to the wind turbines a corresponding turbine reactive power target value. This, too, shall be claimed according to the invention or, respectively, as a separate teaching.

BRIEF DESCRIPTION OF THE SEVERAL VIEWS OF THE DRAWINGS

The invention is now described in more detail below, using embodiments as examples with reference to the accompanying figures.

DETAILED DESCRIPTION

Figure 1:
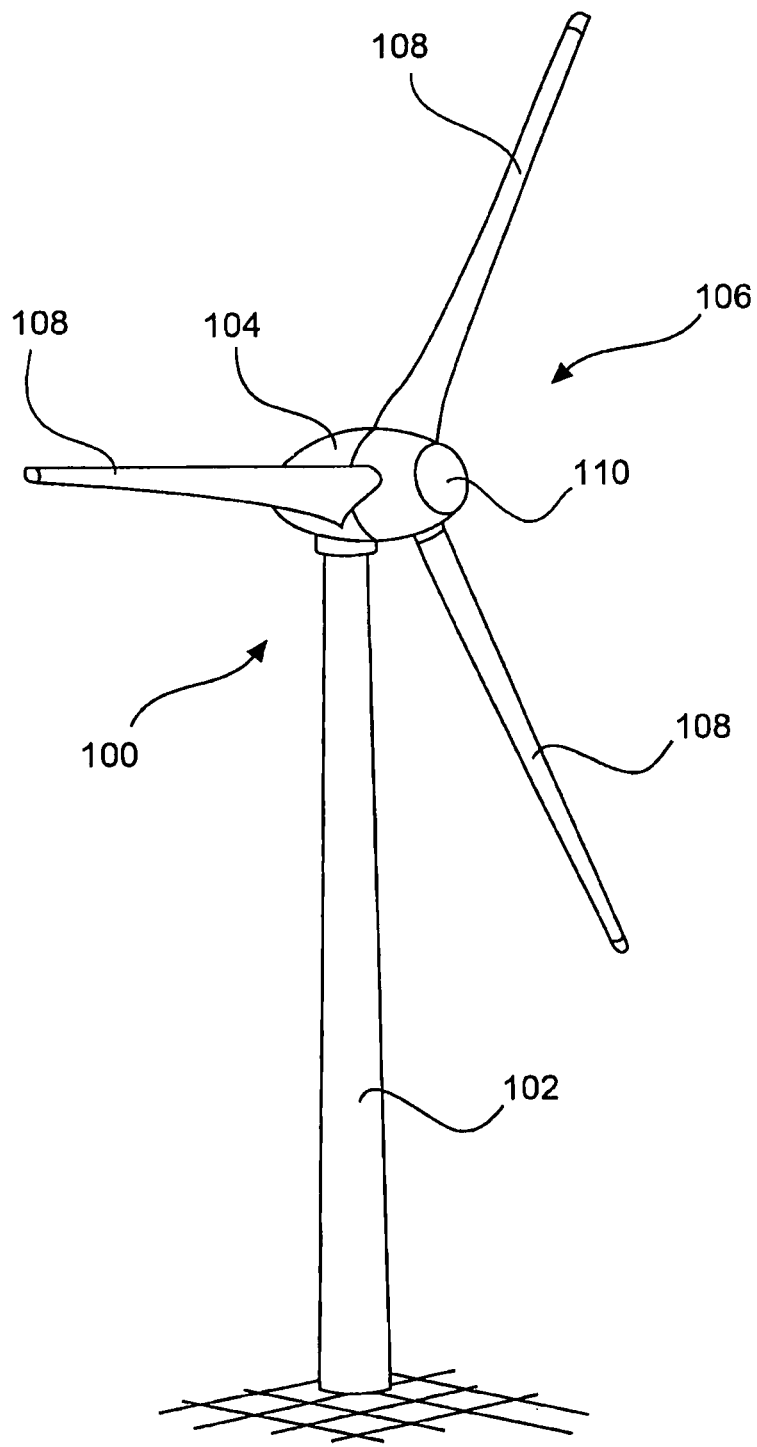
FIG. 1 schematically shows a wind turbine.

FIG. 1 shows a wind turbine 100 with a tower 102 and nacelle 104. A rotor 106 with three rotor blades 108 and a spinner 110 is located on the nacelle 104. When in operation, the rotor 106 is brought to a rotating movement by the wind and thereby drives a generator in the nacelle 104.

Figure 2:
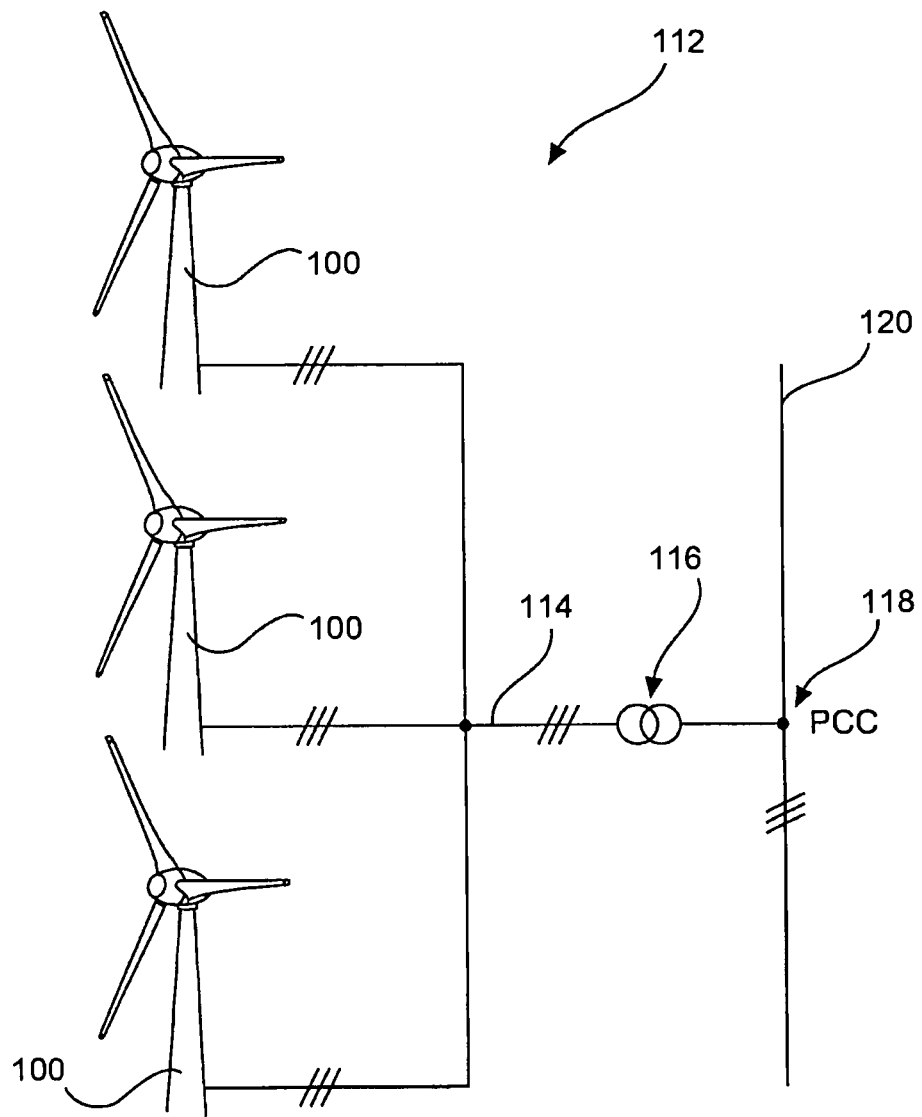
FIG. 2 schematically shows a wind park.

FIG. 2 shows a wind park 112 with, for example, three wind turbines 100, which may be the same or different from each other. The three wind turbines 100 are thus representative of a basically random number of wind turbines of the wind park 112. The wind turbines 100 provide their power, in particular the generated electricity, via an electric wind park grid 114. The currents or, respectively, powers generated by the individual wind turbines 100 are added up. Most often, a transformer 116 will be provided, which transports the voltage at the wind park to then supply it into the supply grid 120 at the supply point 118, which is also generally referred to as a PCC. FIG. 2 is merely a simplified illustration of a wind park 112, which does not show, for example, a control, although a control exists, of course. Also, the wind park grid 114 may be designed differently, including, for example, a transformer at the output of each wind turbine 100, to mention just one other embodiment.

Figure 3:
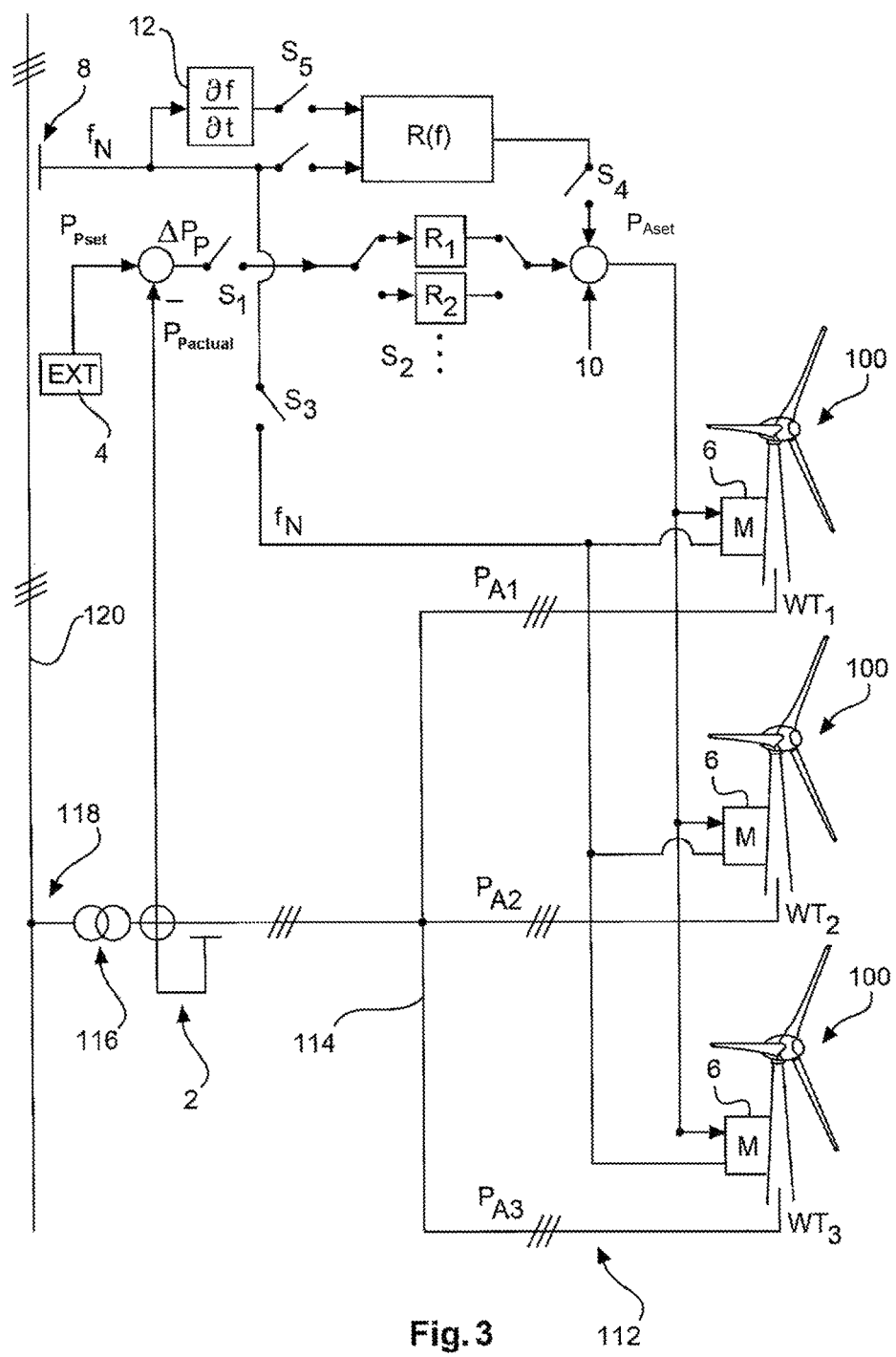
FIG. 3 shows, for illustration purposes, a wind park with a control structure.

FIG. 3 shows, in particular, one control structure of a wind park 112, including a wind park grid 114. Insofar as the structures of the wind park 112 shown in FIG. 3 are at least similar to the wind park 112 shown in FIG. 2, the same reference sign has been used between FIG. 2 and FIG. 3 for the purpose of more clarity. In this respect, the wind park 112 of FIG. 3 also shows a wind park grid 114, which supplies into a supply grid 120 via a transformer 116 at a grid supply point 118. Both the wind park grid 114 and the supply grid 120, which for the sake of simplicity may be also referred to simply as a grid, are three-phase grids.

A power meter unit 2 measures the currently generated wind park actual output $P_{Pactual}$. At a summing point, the generated wind park output is compared to a specified wind park target output $P_{Pset}$ and, as a result, indicates a wind park difference $\Delta P_P$. The wind park target output $P_{Pset}$ may be specified by an external unit 4, for example by the operator of the supply grid 120.

The thus determined difference $\Delta P_P$ is regarded as the control deviation $\Delta P_P$. Said wind park difference is then supplied to a controller $R_1$, if switch $S_1$ is closed and switch $S_2$ is in the position as shown. The controller $R_1$ will generate a turbine target value $P_{Aset}$, if switch $S_4$ is in the open position, as shown.

All of the switches shown in FIG. 3, namely switches $S_1$ through $S_5$, serve for illustration purposes. In actual implementation, their function, which is described below, can often be realized in a completely different way.

The thus generated turbine target value $P_{Aset}$ is then provided to each turbine control 6 of the respective wind turbine 100. Each turbine control 6 controls the respective installation such that the latter issues a corresponding power $P_{A1}$, $P_{A2}$ or, respectively, $P_{A3}$ and/or provides such power, which is then supplied to the grid 120. According to one state of operation—which is described, in particular, by FIG. 3, as shown, but with closed switch $S_1$—these individual turbine outputs $P_{A1}$, $P_{A2}$ or, respectively, $P_{A3}$ follow the turbine target value $P_{Aset}$. The turbine target value $P_{Aset}$ is a standardized parameter lying, for example, between 0 and 100 percent (i.e., between 0 and 1). In one embodiment, which is also the basis of the description in FIG. 3, the turbine target value $P_{Aset}$ relates to the nominal power $P_N$ of the respective wind turbine 100. For example, if the nominal power of the first wind turbine $WT_1$ is one MW, and the nominal power of the other two wind turbines $WT_2$ and $WT_3$ is two MW each, a value of 50 percent means, in terms of the turbine target value $P_{Aset}$, a power of 500 kW for the first wind turbine $WT_1$ and a value of 1 MW each for wind turbines $WT_2$ and $WT_3$. This means that a total of 2.5 MW would be generated in this example. Such generated overall wind park output would be recorded at metering point 2 and would then be available to the wind park control.

According to the control structure in FIG. 3, a recording of the difference between the target and the actual value takes place for the wind park output. The result of such recording is then available to a controller, which calculates a turbine target value based thereon. In this context, such turbine target value is provided to several (possibly different) wind turbines. Preferably, however, they will all be given the same input value, which value would still result in different generated powers.

What is moreover proposed are some switching options that are illustrated based on switches $S_1$ through $S_5$. Switch $S_1$ illustrates that there is also an option of not providing the difference between the wind park target value $P_{Aset}$ and wind park actual output $P_{Pactual}$ to the controller. In fact, this option reflects the situation where no target value at all is specified for the wind park output $P_{Aset}$ to be supplied, or, respectively, where such value is 100 percent. In that case, no target value specification takes effect, which is to be illustrated by the open switch $S_1$. Here, the controller will issue 100 percent as the turbine target value $P_{Aset}$. All turbine controls 6 are thus given the signal that they do not have to reduce any power. Each wind turbine 100—or, respectively, $WT_1$, $WT_2$ and $WT_3$—can generate as much power as possible under the prevailing wind conditions.

If the switch $S_1$ is closed, the specification of the turbine target value $P_{Aset}$ becomes active depending on a default value of the wind park target value $P_{Aset}$ that is to be supplied. In that case, the controller $R_1$, which is shown for illustration purposes, initially controls the turbine target value $P_{Aset}$. To this end, the controller $R_1$ may be designed, for example, as a PI-controller. This means it has a proportional and an integral portion. Difference $\Delta P_P$ is thus promptly translated into part of the turbine target value $P_{Aset}$ via the proportional portion, and the integral portion can try to achieve a stationary accuracy. In order to be able to consider an adjustment to other operating conditions of the wind park 112 or of the supply grid 120, it is proposed to switch controllers. This is illustrated by switch $S_2$, which can be used to switch, for example, to controller $R_2$. Of course, the following, unnamed switch needs to be switched accordingly. The dots suggest that further controllers may be provided to switch to them.

For example, in order to avoid vibration it may be advantageous to dispense with one integral portion and use a pure P-controller. This may be an option, for example, if another control algorithm is to be added. The switching of controllers, as illustrated by switch $S_2$, may also be a switching to a controller of the same type but with different parametrization. Especially the more complex controllers, but even the PI-controller, feature several parameters that should be synchronized. The switching between controllers ensures the existence of a coherent set of parameters. Such switching can, of course, also be realized in a process computer by assigning a new set of parameters.

FIG. 3 moreover illustrates that a frequency meter 8 is provided for, which measures grid frequency $f_N$. In general, said grid frequency can also be measured at wind park grid 114. Such centralized measuring of the grid frequency $f_N$ is advantageous not only for illustration purposes, but often also in practical implementation. Said grid frequency $f_N$ is then provided to the turbine controls 6 via, inter alia, switch $S_3$. In the operating condition shown and described above, switch $S_3$ is open and the turbine controls 6 work without considering the grid frequency, as regards to the adjustment of the power control. When generating the currents to be supplied, the installations must, of course, consider the grid's frequency and phase. Such consideration is not to be affected by said switch $S_3$.

Now, if switch $S_3$ is closed, the grid frequency will be provided to turbine control 6, which is to show that the control of the respective output $P_{A1}$, $P_{A2}$ or, respectively, $P_{A3}$ will now consider this grid frequency $f_N$. This means that the generated power may be reduced—in particular quickly reduced—by each turbine control if the grid frequency $f_N$ rises above a predefined limit or threshold. However, the grid frequency of either turbine control may be always known, especially in practical application, as it is required for adjusting the frequency and phase. Here, however, it shall be left unconsidered for the determination of the power level. This means that here, the closed switch $S_3$ symbolizes the consideration of the grid frequency $f_N$ for the determination of the power levels $P_{A1}$, $P_{A2}$ and $P_{A3}$.

The grid frequency can, however, also be considered by the higher-level controller, which determines the turbine target value $P_{Aset}$, as illustrated by switch $S_4$. Switch $S_4$ symbolizes that the turbine target value $P_{Aset}$ is co-determined by a frequency-dependent controller $R(f)$. This is what summing point 10 is provided for. What is also important aside from controller $R_1$—or $R_2$, depending on the position of switch $S_2$—is the calculation performed by controller $R(f)$. The complementing of the two controllers can also take place in a different manner than by summation. One could, for example, switch to an overall controller that considers both the power difference of the wind park $\Delta P_P$ and the grid frequency $f_N$.

The frequency-dependent controller or, respectively, the frequency-dependent partial controller $R(f)$ may depend directly on the frequency, or it may also, or as an alternative, depend on a change in frequency $\partial f/\partial t$, as illustrated by block 12. Block 12 shows a partial derivative of the frequency according to time $\partial f/\partial t$, which can also be realized in a process computer through difference formation, or otherwise. In any event, switch $S_5$ shows that partial controller $R(f)$ may depend directly on the grid frequency $f_N$ or its change, or both.

It may be advisable to close switch $S_4$ when switch $S_3$ is open, and vice versa, in order to consider a frequency dependence in only one manner, namely either centrally via the partial controller $R(f)$ or in every single turbine control 6. However, simultaneous consideration when the controllers concerned are accordingly coordinated shall not be ruled out.

It is furthermore pointed out that the illustrated switching actions can be performed in a targeted manner through an external input, i.e., through an external signal or external indicator, or that an algorithm controlling such switching actions is provided, which depends preferably on the grid frequency and/or on a time-related change in grid frequency.

As regards to the above-mentioned basic control types, basic control type 1 corresponds to the situation shown in FIG. 3, where the switches $S_1$, $S_3$ and $S_4$ are open. Basic control type 2 corresponds to the illustration shown in FIG. 3, with the difference that switch $S_2$ is closed. When it comes to basic control type 2, however, switch $S_2$ may select different controllers $R_1$ or $R_2$, or others.

Basic control type 3 corresponds to the situation shown in FIG. 3, with switch $S_1$ and switch $S_3$ being closed, however. This means that what is active here, in addition, is a frequency-dependent determination of the power level in every turbine control 6.

Basic control type 4 corresponds to the situation shown in FIG. 3, with switch $S_1$ and switch $S_4$ being closed, however. This means that here, a turbine target value is also influenced based on frequency.

If in this situation—i.e., with basic control type 4—switch $S_3$ is additionally closed, a frequency-dependent power level determination is moreover active in every turbine control 6. This situation can be referred to as basic control type 5. In the case of said basic control types 4 and 5, switching can moreover take place through switch $S_2$, i.e., a selection between controller $R_1$, $R_2$ or other suggested controllers.

Figure 4:
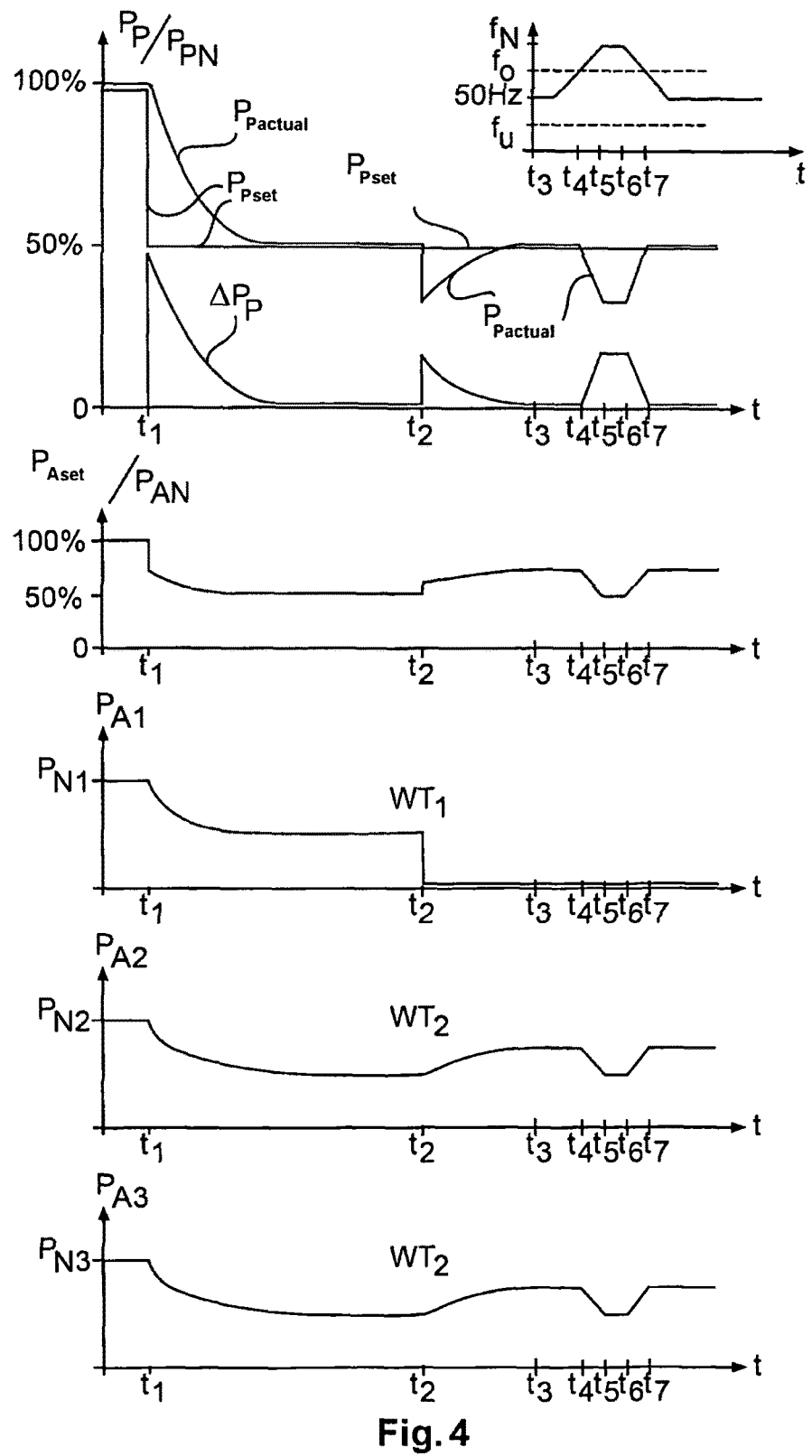
FIG. 4 shows several time diagrams to illustrate potential control processes.

FIG. 4 shows several time diagrams to illustrate a potential wind park control process. All diagrams are based on the same time bar. The top diagram shows the course of the wind park output, namely of both the specified wind park target output $P_{Pset}$ and of the wind park actual output $P_{Pactual}$ and of the control difference between wind park target output $P_{Pset}$ and wind park actual output $P_{Pactual}$, which is also referred to here as $\Delta P_P$. Such three courses are normalized with the nominal power of the wind park $P_{PN}$ or, respectively, expressed in percent for the sake of convenience.

The second diagram shows the turbine target value $P_A$ in a standardized form, namely as a percentage value.

The last three diagrams each show the power $P_{A1}$, $P_{A2}$ or, respectively, $P_{A3}$ generated by the three wind turbines $WT_1$, $WT_2$ and $WT_3$ pursuant to FIG. 3. The quantity of 3 has been chosen only for the purpose of illustration. Although a wind park may consist of only three wind turbines, it generally comprises considerably more wind turbines. The diagrams in FIG. 4 suggest that the wind conditions allow each of the wind turbines $WT_1$, $WT_2$ and $WT_3$ to generate nominal power, i.e., $P_{N1}$, $P_{N2}$ and $P_{N3}$. In the illustration, the individual outputs of the wind turbines are also shown as relating to their nominal powers $P_{N1}$, $P_{N2}$ and $P_{N3}$.

The diagram starts with a default value of 100 percent for wind park output. This means that no restriction applies. At the time $t_1$, the wind park target value $P_{Pset}$ is reduced to 50 percent. This means that the wind park difference $\Delta P_P$ initially rises to 50 percent, as well. The present adjustment control would be the one pursuant to FIG. 3, with switch $S_1$ being closed. The difference in wind park output $\Delta P_P$, which has jumped to 50 percent, is now provided to controller $R_1$. If said controller $R_1$ is a PI-controller, the turbine target value, which can also be referred to as $P_{Aset}$, will jump from 100 percent to, for example, 75 percent. Because of the I-portion, the target value $P_A$ will drop to 50 percent over time t. All turbine outputs $P_{A1}$, $P_{A2}$ and $P_{A3}$ will also drop to 50 percent of their nominal power, as required by the turbine target value $P_{Aset}$. The sudden drop to 75 percent is not, however, reflected by the actual values of the individual turbine outputs, which means that this diagram is to suggest a certain dynamics or, respectively, physical inertia.

After some time, all turbine outputs $P_{A1}$, $P_{A2}$ and $P_{A3}$ will have dropped to 50 percent of their nominal power. The diagram shown in FIG. 4 is based on the assumption that all three wind turbines have the same nominal power $P_{N1}=P_{N2}=P_{N3}$. Accordingly, the actual value of the wind park output has dropped to 50 percent and thus corresponds to the specified wind park target output $P_{Pset}$. In the above diagram, the two graphs of the actual value $P_{Pactual}$ and of the wind park target output $P_{Pset}$ have been drawn at a small distance from each other only for the sake of better visibility. Ideally, these values in this example are identical.

It is now assumed that the first installation $WT_1$ stops working at time $t_2$. Its power $P_{A1}$ will thus suddenly drop to 0. As a result, the wind park actual output $P_{Pactual}$ will also drop suddenly, and the power difference $\Delta P_P$ of the wind park will rise by a corresponding value. The turbine target value $P_{Aset}$ will also change and increase by a small value to then keep rising, because the controller $R_1$ in effect is still a PI-controller.

Of course, the first wind turbine $WT_1$ cannot follow such changed turbine target value, because it has stopped working. However, the other two installations $WT_2$ and $WT_3$ can increase their output. The wind park output will increase accordingly to again reach the wind park target output $P_{Pset}$. The wind park actual output $P_{Pactual}$ will thus reach 50 percent again. But the outputs $P_{A2}$ and $P_{A3}$ of the second and third wind turbine will be only at around 75 percent of their nominal value $P_{N2}$ or, respectively, $P_{N3}$. Please note that the wind park target value $P_{Pset}$ has remained unchanged at 50 percent since time $t_1$.

Now, at the time $t_3$ the grid operator decides that the wind park will have to be used for a controlled grid stabilization, based on frequency. This was not the case before. Such grid stabilization is to be performed by a central wind park controller and not individually by every turbine. As a result, this means that switch $S_4$ in the illustration of FIG. 3 is closed. Incidentally, the lower part of the switch $S_5$ must be closed as well. This means that, in addition, a frequency-dependent controller portion is enabled. However, the diagram of FIG. 4 does not show any effect whatsoever. This is because the grid frequency still shows approximately its nominal value at the time $t_3$. Moreover, the frequency $f_N$ is shown in an inserted diagram on the upper right-hand side only beginning as of $t_3$. The nominal frequency assumed here is 50 hertz, which may be for example 60 hertz in other parts of the world.

However, the grid frequency starts to rise between $t_3$ and $t_4$, to finally exceed an upper threshold $f_O$ at $t_4$. Now, the frequency-dependent controller, which was enabled at $t_3$, becomes active and requires the wind park output to go down. This is achieved by reducing the turbine target value $P_{Aset}$. The wind park target value $P_{Pset}$ remains unchanged at 50 percent.

The frequency reaches its highest value at $t_5$ and remains there until $t_6$. Accordingly, the turbine target value $P_{Aset}$ reaches its smallest local value at $t_5$. The wind turbine $WT_1$ still does not work, and the second and third wind turbine $WT_2$ and $WT_3$ follow the turbine target value $P_{Aset}$ and drop their power $P_{A2}$ or, respectively, $P_{A3}$ accordingly. It should also be noted that this frequency-dependent reduction in the turbine target value $P_{Aset}$ takes place very fast. This means that according to this example, the controller dynamics of said frequency-dependent controller (shown as R(f) in FIG. 3) is higher than that of controller $R_1$.

In any event, the frequency starts to drop again at $t_6$ and falls below the upper threshold at $t_7$. The turbine target value $P_{Aset}$ starts to rise again at $t_6$ to basically reach the frequency-independent target value at $t_7$. The turbine outputs $P_{A2}$ and $P_{A3}$ follow accordingly, and at $t_7$ the value of the wind park actual output $P_{Pactual}$ is again at the externally specified 50 percent.

The invention claimed is:

1. A method for supplying electric power of a wind park that includes a plurality of wind turbines to an electric power supply grid, method comprising:
   generating an electric turbine output at each of the plurality of wind turbines;
   summing the generated electric turbine outputs to obtain a wind park output and providing the wind park output to the electric power supply grid;
   specifying a turbine target value for each of the wind turbines based on the wind park output;

selecting, using an external selection signal, a controller type, wherein the controller type is selected or changed depending on a grid sensitivity of the electric power supply grid; and controlling the turbine target value using a controller having the selected controller type based on a control deviation that is a comparison of the wind park output and a target value of the wind park output, wherein the controller specifies the same value as the turbine target value for each wind turbine of the plurality of wind turbines.

2. The method according to claim 1, wherein the controller specifies the turbine target value as a percentage target value in relation to the respective nominal power of the wind turbine.

3. The method according to claim 1, wherein at least one of the controller type and a parameterization is selected or changed based on one or more of the following:
a grid frequency,
a change in grid frequency, and
a short circuit ratio.

4. The method according to claim 1, wherein the controller has one of the following controller types:
P-controller,
PI-controller,
PT1-controller, and
hysteresis controller.

5. The method according to claim 1 further comprising recording a grid frequency of the voltage of the supply grid, and wherein the turbine target value depends on at least one of the grid frequency and a change in the grid frequency.

6. The method according to claim 1 wherein the turbine target value is specified for each wind turbine of the wind park by a central control unit of the wind park.

7. A wind park for supplying electric power into a supply grid, with the wind park applying a method according to claim 1 to supply electric power.

8. The method according to claim 5, wherein each turbine sets its output based on the turbine target value and at least one of the grid frequency and a change in the grid frequency.

9. The method according to claim 1, further comprising transmitting the recorded grid frequency to all wind turbines of the wind park by a central control unit.

10. The method according to claim 1, further comprising:
changing, using the external selection signal, the controller type.

11. The method according to claim 1 wherein the controller type is selected from a plurality of controller types.

12. The method according to claim 1, comprising:
receiving the external selection signal from a grid operator; and
selecting, based on the external selection signal, the controller type.

13. The method according to claim 1, wherein the external selection signal is external to the plurality of wind turbines.

* * * * *